United States Patent [19]  [11] 4,097,755
Kitai et al.  [45] Jun. 27, 1978

[54] CONSTRUCTION OF ELECTROMAGNETIC DRIVING DEVICE

[75] Inventors: Kiyoshi Kitai, Tokyo; Masuo Ogihara, Chiba; Kozo Sato, Yotsukaido; Nobuo Shinozaki, Chiba, all of Japan

[73] Assignee: Seiko Koki Kabushiki Kaisha, Japan

[21] Appl. No.: 685,408

[22] Filed: May 11, 1976

[30] Foreign Application Priority Data

May 14, 1975 Japan ................................ 50-57101
May 14, 1975 Japan ........................... 50-63774[U]
May 14, 1975 Japan ........................... 50-63778[U]

[51] Int. Cl.² .................................................. H02K 16/02
[52] U.S. Cl. ........................................ 310/114; 310/83; 310/156; 310/162; 310/194
[58] Field of Search .................. 310/83, 165, 162, 194, 310/163, 114, 164, 43, 49, 84, 40 MM, 258, 103–105, 80, 259, 156, 90, 91, 112; 58/23, 23 D, 59, 26

[56] References Cited

U.S. PATENT DOCUMENTS

| 3,248,867 | 5/1966 | Jepson | 310/83 UX |
| 3,497,734 | 2/1970 | Petrides | 58/23 |
| 3,790,833 | 2/1974 | Hasebe | 310/162 |
| 3,863,084 | 1/1975 | Hasebe | 310/162 |
| 3,873,865 | 3/1975 | Preiser | 310/164 |
| 3,901,019 | 8/1975 | Kocher | 58/59 |
| 3,909,646 | 9/1975 | Haydon | 310/83 |
| 3,945,194 | 3/1976 | Erard | 58/59 |
| 3,978,654 | 9/1976 | Koike | 58/23 |

Primary Examiner—R. Skudy
Attorney, Agent, or Firm—Robert E. Burns; Emmanuel J. Lobato; Bruce L. Adams

[57] ABSTRACT

An electromechanical driving device comprising a permanent magnet rotor mounted for rotation on a non-magnetic support plate, and a wheel train mounted on the support plate and driven by the rotor. A coreless field coil is mounted on the support plate and positioned to drive the rotor and thereby drive the wheel train when the coreless field coil is energized. The coreless coil is wound on a coil bobbin having an axial bore. The support plate includes a projecting portion dimensioned to fit within the axial bore of the bobbin to support the bobbin and thereby mount the same on the support plate.

6 Claims, 10 Drawing Figures

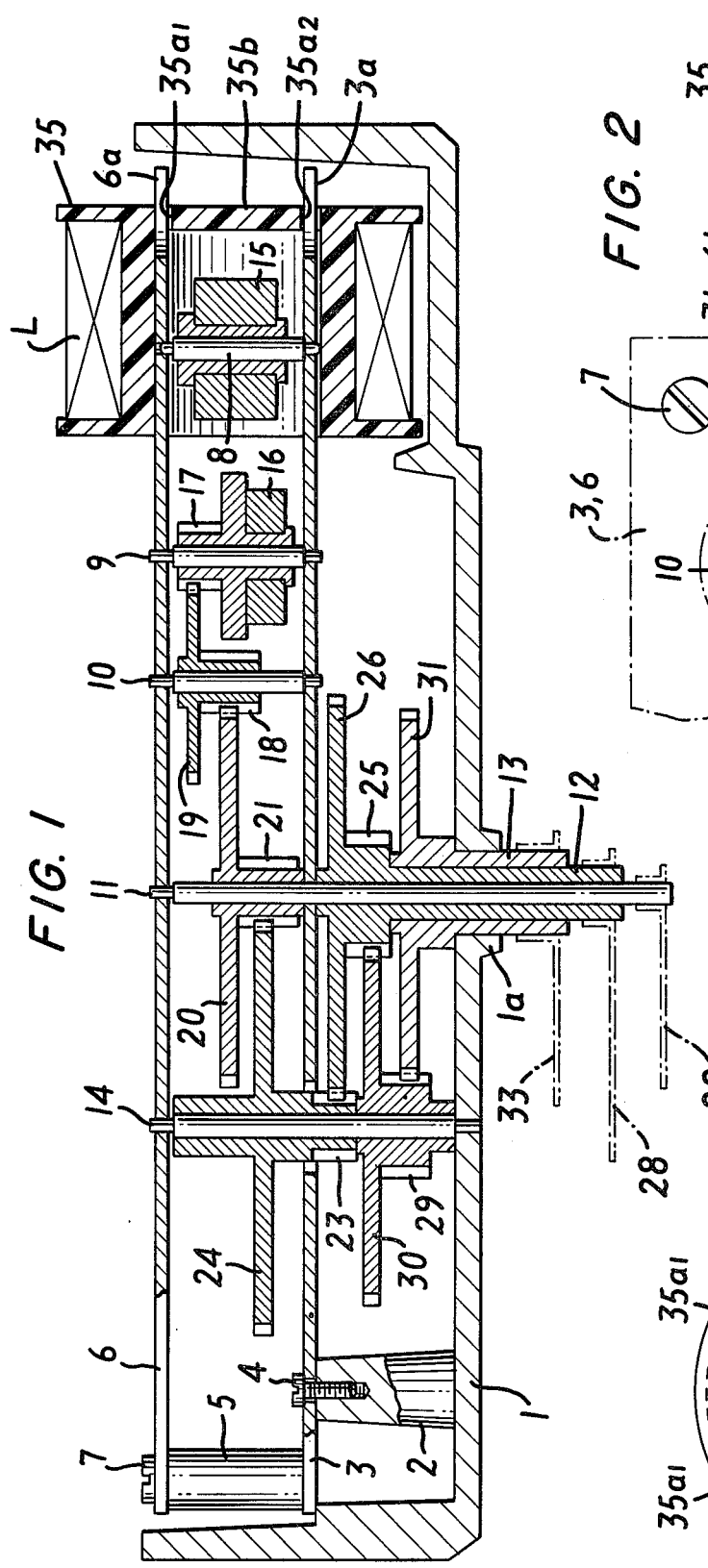
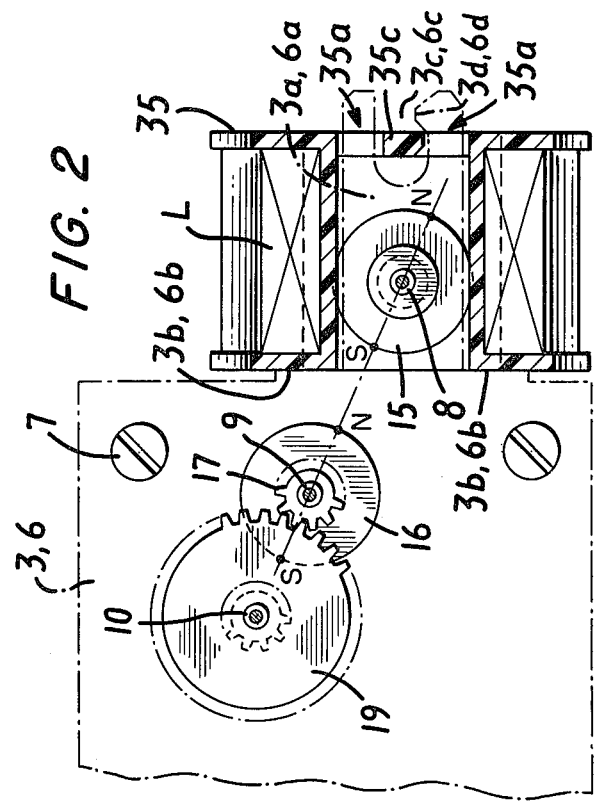
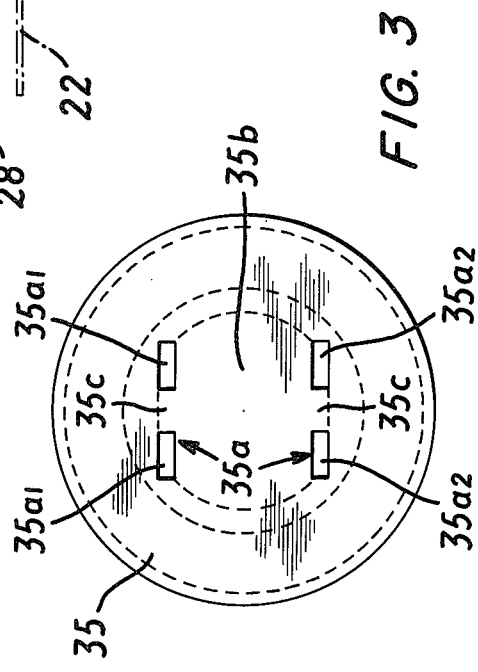
FIG. 1
FIG. 2
FIG. 3

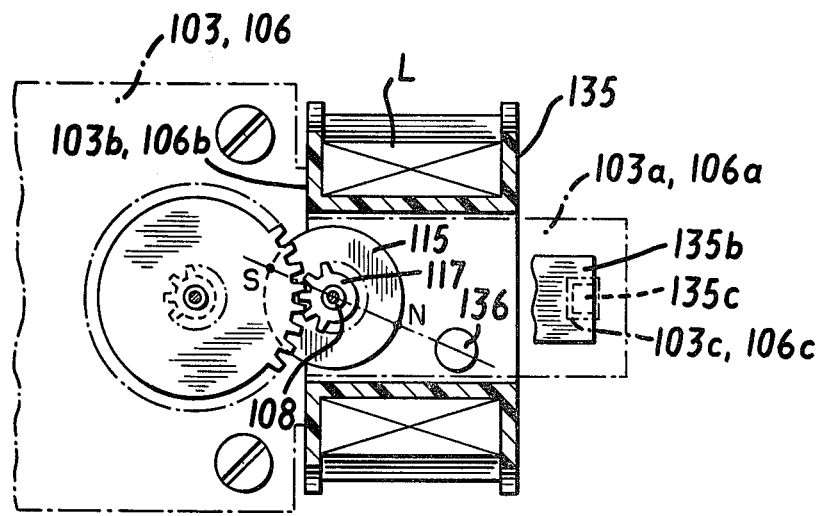
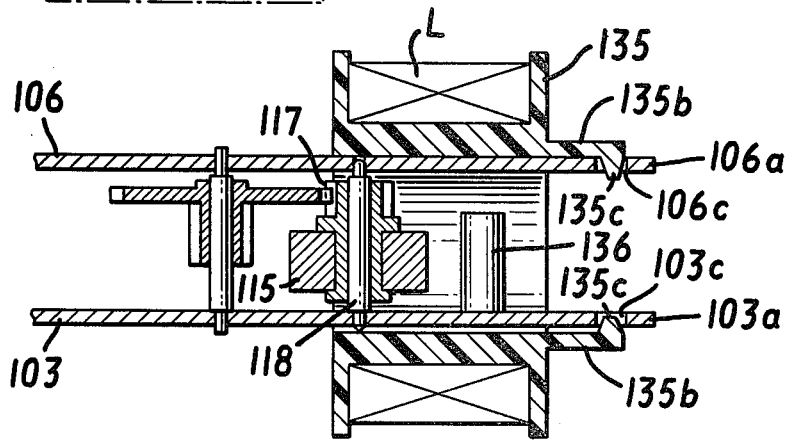
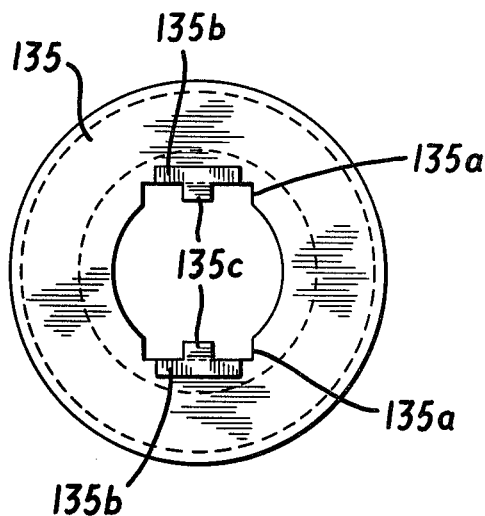
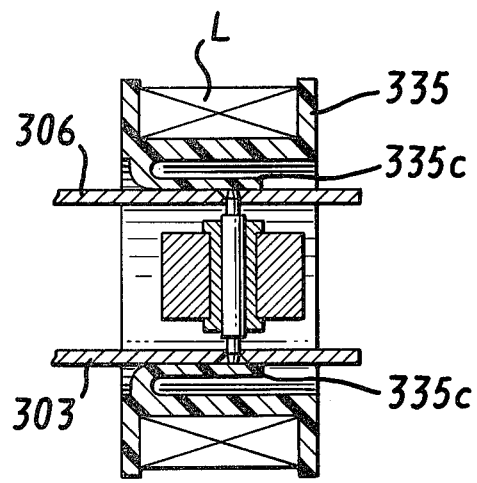

CONSTRUCTION OF ELECTROMAGNETIC DRIVING DEVICE

BACKGROUND OF THE INVENTION

The present invention relates to an electromagnetic driving device, and more particularly it relates to a constuction of an electromagnetic driving device that drives a polar rotor by means of a coreless field coil.

In the hetherto-used divices of this kind, a synchronous motor constitutes a unit and a train of gear wheels that transfers the output thereof also constitutes a unit, and these units are respectively combined by means of combination elements such as screws or the like.

However, in these devices a structual base plate must be provided in each unit, and combination elements are needed for combining the respective units, so that not only the number of constituent parts is increased but also a economical disadvantage is brought about because of an increase of the number of assembling step, and because of a large space required for housing these elements that are seemingly unnecessary.

SUMMARY OF THE INVENTION

It is an object of the present invention to provide an electromechanical driving device including, support structure for all of the moving parts of the device and in order to improve engagement of the moving parts and minimize transfer losses between the moving parts.

It is another object of the present invention to provide an electromechanical driving device utilizing a coreless field coil mounted within the device by mounting structure which is effective to determine the orientation of the magnetic field developed by the coreless field coil.

The electromechanical driving device according to the invention includes at least one permanent magnet rotor having a plurality of magnetic poles, and a wheel train driven by the rotor. The rotor and the wheel train are both mounted for rotation on at least one non-magnetic support plate. A coreless field coil is also mounted on the support plate and is positioned to drive the rotor with an electromagnetic field developed when the field coil is energized, thereby to drive the wheel train. The coreless coil is wound on a coil bobbin and the support plate includes mounting means coactive with the coil bobbin for mounting the coil on the support plate positioned relative to the rotor so that the electromagnetic field developed by the coil has a particular predetermined orientation relative to the rotor.

BRIEF DESCRIPTION OF THE DRAWINGS

FIG. 1 is a cross-sectional view of an electromechanical driving device according to the invention;

FIG. 2 is a partial plan view of the embodiment of the invention illustrated in FIG. 1;

FIG. 3 is a partial side view of the structure illustrated in FIG. 2;

FIG. 4 is a plan view of a second embodiment of the electromechanical driving device according to the invention;

FIG. 5 is a cross-sectional view of the embodiment of the invention illustrated in FIG. 4;

FIG. 6 is a side view of the structure illustrated in FIG. 4;

FIG. 10 is a partial cross-sectional view of a fourth embodiment of the present invention.

DESCRIPTION OF THE PREFERRED EMBODIMENTS

Figure 7:
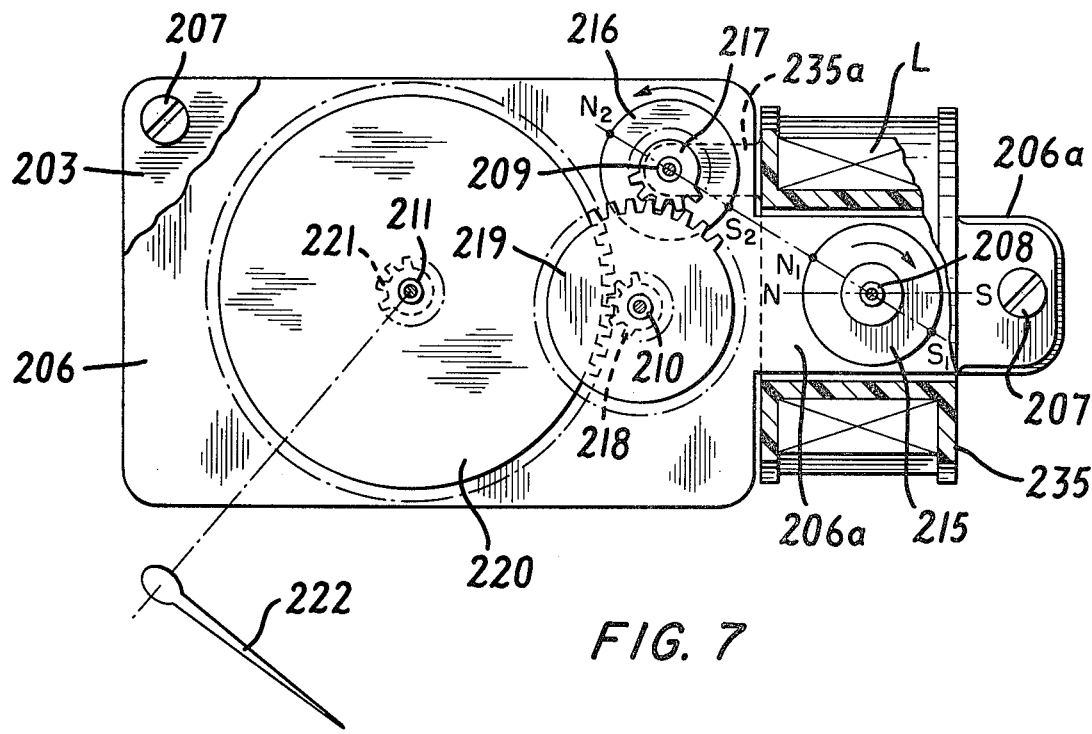
FIG. 7 illustrates a plan view of a third embodiment of the electromechanical driving device according to the invention.

In the following is described on the embodiments shown in the drawings. First of all, the 1st embodiment shown in FIGS. 1 through 3 is described.

First, said synchronous motor is described. L is a coreless field coil wound with wire, within which a driving rotor 15 magnetized into 2 poles of N, S polarity is rotatably arranged centered on shaft 8. Also a supplementary rotor 16 magnetized into two poles of N, S polarity is rotatably arranged centered on shaft 9 at a position displaced by a definite angle relative to the central direction of the magnetic field of said coil L. In the static state the respective poles of these rotors are at rest on a line connecting the respective shafts 8, 9 as shown in FIG. 2. In this state, when an alternating current pulse signal is impressed on the coil L, the driving rotor 15 rotates clockwise at 180° increments corresponding to each pulse, and the supplementary rotor 16 in an attractive relation to this driving rotor rotates counterclockwise at 180° increments following the above-mentioned rotation. Next, using the cross-sectional view shown in FIG. 1, the structure illustrated therein is described. A case 1 includes a projecting boss 2, an intermediate plate 3 that carries a column 5 and is fixed to said boss 2 by a screw 4, and an upper plate 6 fixed to said column 5 with a screw 7. Shafts 8, 9, 10 and a second-hand shaft 11 are rotatably supported by said upper plate 6 and said intermediate plate 3, and a minute-hand pipe 12 and an hour-hand pipe 13 are rotatably supported coaxially with said second-hand shaft 11 and said case 1, and shaft 14 is fitted to the case 1. To said shaft 8 is fixed the aforementioned driving rotor 15.

Here, how to set the coil L provided about the outer circumference of said driving rotor 15 is described referring to FIG. 2 and FIG. 3. Said upper plate 6 and intermediate plate 3 are provided with thin arms 6a, 3a in order that a bobbin 35 of the coil L is inserted thereon, and at the middle portion thereof is rotatably supported said driving rotor 15. And at the roots of said arms 6a, 6b are formed striking or stop surfaces against which the end surfaces of said bobbin 35 strike respectively, and at the ends thereof are provided grooves or notches 6c, 3c and fitting parts or projections 6d, 3d projected in the direction to make these grooves or notches narrow. On the other hand, the center of the bobbin 35 formed with synthetic resin defines a rectangular cavity, the width thereof is formed somewhat wider than that of the arms 6a, 3a of said plates 6, 3 and one end of said cavity opens widely and the other end is covered with a wall 35b having four small holes 35a. And two of said small holes constitute a pair, and an arm 35c is formed between the respective pairs, and the inside dimensions of said upper small holes $35a_1$ and small holes $35a_2$ are set slightly smaller than the inside dimensions of said upper plate 6 and intermediate plate 3. When the bobbin 35 thus formed is inserted on the arms 6a, 3a of said upper plate and intermediate plate, the direction of magnetic field of the coil L is determined by the inside wall of said bobbin 35 which is guided by said arms 6a, 3a. And when the bobbin 35 is further inserted, the ends of the arms 6a, 3a of said upper and intermediate plates are inserted into the small holes 35$a_1$, 35$a_2$ provided on the wall 35b of the bobbin 35. Thereafter, if subjected to further insertion, the arm 35c of the bobbin 35 passes over the fitting parts or projections 6d, 3d provided at the arms of the upper and intermediate plates with a slight deformation, then stops when the end surfaces of the bobbin strike against the respective striking surfaces or stop 6b, 3b. At this moment, the interval between the upper plate 6 and the intermediate plate 3 will remain fixed, since the respectives ends thereof are guided and supported by the small holes 35$a_1$, 35$a_2$ provided on the wall 35b of said bobbin, and the bobbin will prevent these plates from deformation in the upper and lower directions, so that a smooth action of said driving rotor 15 is insured. In this way, the bobbin of the coil L is mounted on the upper plate 6 and intermediate plate 3.

Referring to FIG. 1 again, the structure of the train of wheels following said driving rotor 15 is described.

To the shaft 9 is fixed the above-mentioned supplementary rotor 16 and a 1st pinion 17 is also fixed thereto. To the shaft 10 are fixed a second pinion 18 and 1st intermediate wheel 19 that engages with said 1st pinion 17. Also to said second-hand shaft 11 are fixed a second unit wheel 20 that engages with the second pinion 18 and a third pinion 21, and said second-hand shaft 11 penetrates through the minute-hand pipe 12 and to the end thereof is fixed a second hand 22. With this third pinion 21 is engaged a second intermediate gear wheel 24 to which is fixed a fourth pinion 23 that is rotatable and centered on said shaft 14. And with said fourth pinion 23 is engaged a minute unit wheel 26. Said minute unit wheel 26 has a fifth pinion 25, and minute-hand pipe 12 formed like a pipe is fixed thereto, and said minute unit wheel 26 is rotatable centered on this pipe 12. And to the end of the minute-hand pipe 12 is fixed a minute hand 28. With the end of said 5th pinion 25 is engaged a third intermediate gear wheel 30 that is rotatable centered on said shaft 14 and provided with a sixth pinion 29.

An hour-unit wheel 31 fixed to the hour-hand pipe 13 is engaged with said fifth pinion 29. This hour-hand pipe 13 is formed like a pipe, to the end thereof is fixed an hour hand 33, the outer diameter thereof is guide by the case 1, and the minute-hand pipe 12 penetrates its center. Rotation of the driving rotor 15 of the synchronous motor mentioned above is transferred to the second-hand 22, minute pipe 28 and hour-pipe 33 through the train of gear wheels constructed as described above.

Next, a second embodiment shown in FIG. 4, FIG. 5 and FIG. 6 is described. In this embodiment only the construction of the synchronous motor is modified compared with the 1st embodiment, and the train of wheels beyond the first pinion 117 fixed to the driving rotor 115 may have the same structure as the wheel train previously described. Accordingly, only the different parts will be described in the following.

Similarly to the aforementioned embodiment, an upper plate 106 and an intermediate plate 103 are provided respectively with thin arms 106a, 103a in order that a bobbin 135 of the coil L may be inserted thereon, and at the middle portion thereof is rotatably supported a driving rotor 115 having N, S-poles magnetized in its circumferential direction. Moreover, to the arm 103a of said intermediate plate is fitted a supplementary pole 136 in order that, in the static state of said driving rotor 115, the pole is displaced at a position deviated by a definite angle relative to the central direction of magnetic field of said coil L.

And at the roots of said upper plate 106 and intermediate plate 103 are formed striking or stop surfaces against which said bobbin 133 strikes respectively, and at the same time rectangular holes 106c, 103c are formed at the ends of said arms 106a, 103a. On the other hand, the center of the bobbin 135 formed with synthetic resin defines a cavity wherein a guide groove 135a for guiding said arms 106a, 103a upward and downward is formed. And at one end surface of the bobbin 135 is formed two fitting arms 135b, and on the surface opposing to the respective arms are provided projections 135c. When the bobbin 115 thus formed is inserted onto the arms 106a, 103a of said upper and intermediate plates, the guide groove 135a of said bobbin is guided on the side surfaces of said arms 106a, 103a, thereby the direction of the magnetic field of said coil L is determined. When the bobbin 135 is pushed-in further, the projections 135c provided on the fitting arms of the bobbin strike against said upper plate 106 and intermediate plate 103, and said projections 135c travel on the respective plate surfaces due to deflection of said fitting arms 135b.

Thereafter, if the bobbin 135 is pushed-in further, the end surface of the bobbin strikes against the striking surfaces 106b, 103b of said upper plate and intermediate plate, and at the same time said projections 135b drop into the rectangular holes 106c, 103c provided in the upper plate and intermediate plate. In this way, the coil L is mounted on said upper plate and intermediate plate. In this embodiment, the synchronous motor is composed of the driving rotor 115, the supplementary poles 136, and said coreless field coil L, and when an alternating magnetic field is impressed, said driving rotor 115 starts its rotation.

And when a 1st pinion 117 is fixed to the shaft 108 of this driving rotor 115, and a train of gear wheels constructed as described above is engaged with this 1st pinion 117, an electric watch similar to that of said embodiment is constructed.

Figure 8:
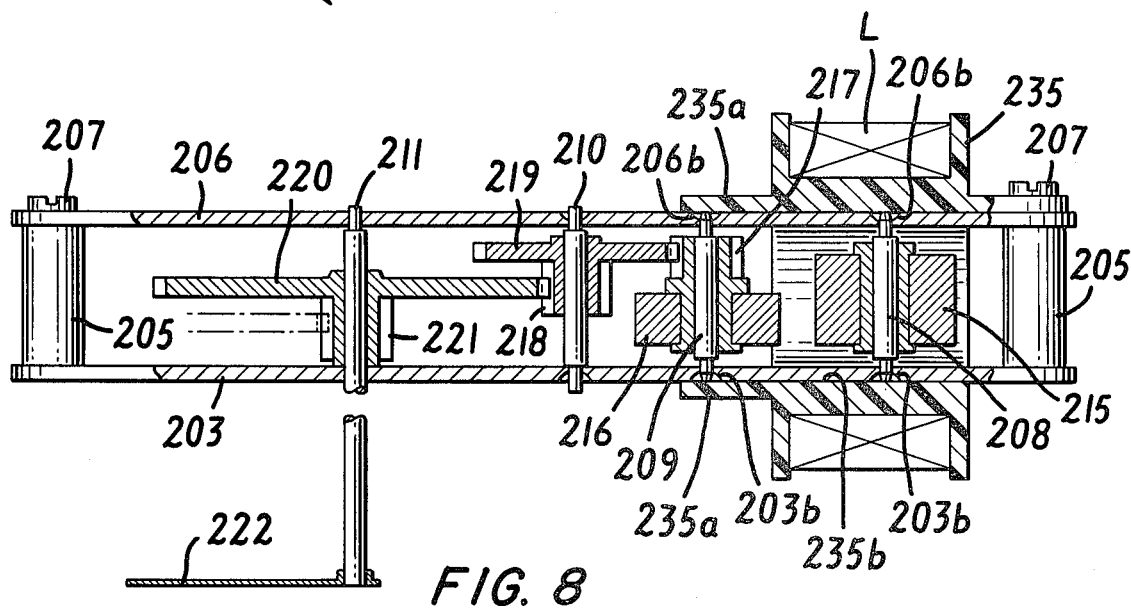
FIG. 8 is a cross-sectional view of the embodiment of the invention illustrated in FIG. 7.
Figure 9:
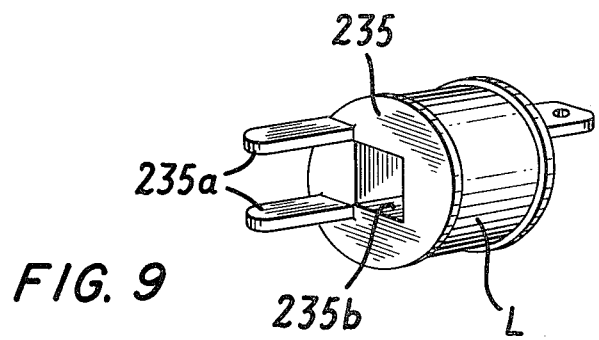
FIG. 9 is an oblique view of the coil bobbin illustrated in FIG. 7.

Next, a third embodiment shown from FIG. 7 to FIG. 9 is described. In this embodiment, there is only a difference in the construction of a bobbin as compared with the 1st embodiment, and the train of wheels beyond the driving rotor 215 is entirely the same, hence, the description thereof is omitted.

In the third embodiment, there are provided in an intermediate plate 203 and an upper plate 206 projections 203a, 206a for positioning a 1st rotor in the hollow part of a bobbin 235, and onto these projections 203a, 206a is inserted the bobbin 235. The bobbin is fixed by screws 207 to a column 205 fitted to the intermediate plate 203 through the upper plate 206. In the rotor shaft hole parts are provided chamfered parts 203b, 206b respectively for reducing the contact area bearing surfaces defined by the rotor shaft holes and maintaining the lubrication oil of the rotor shafts.

The inside wall surface of the hollow-part of said bobbin 235 is formed so as to receive the thrust of the first rotor shaft 208 as well as to receive the thrust of the second rotor shaft 209. In the above-mentioned mechanism, the bearing part of the rotor shafts 208, 209 having small driving torque are composed of a radial bearing part opposite the upper plate 206 and the intermediate plate 203 and a thrust bearing part opposite the inside wall surface 235b of the bobbin 235 and the bearing block 235a, so that it is possible to reduce the variation of frictional resistance coming from the mode of behavior as well as to reduce the loss coming from the driving torque.

Further, since the bobbin 135 is formed with flexible synthetic resin, the bearing block 235a of the thrust bearing has a damping effect against an impulse in the direction of thrust. FIG. 10 illustrates another embodiment wherein a bearing block 335c is provided in the hollow part of a bobbin 335.

As the bearing of a watch runs for more than one year without supply of lubrication oil, consideration of the problem of maintenance of lubrication is needed. But the oil supplied into the holes about the rotor shaft bearings of the intermediate plate 203 and upper plate 206 is maintained at the chamfered parts 203b, 206b and the bearing part is covered with the inside wall surface and the bearing block 235a. This yields good results in minimizing the contact of the oil with atmosphere and also in preventing the deterioration of the oil as well as the penetration of dust into the oil and onto the bearing.

Lastly, it is noted that, in case the oil at the bearing part flows out or is displaced due to the capillary phenomenon, or viscosity of oil, a structure for retaining the oil is easily obtainable by providing convex projections at either of the periphery of holes for the rotor shafts at the upper plate 206 and inter mediate plate 203, the inside wall surface 235b of the bobbin 235, and the circumference of the bearing part of the bearing block 235a.

We claim:

1. An electromechanical driving device comprising:
   first and second permanent magnet rotors each having a plurality of magnetic poles;
   at least one non-magnetic support plate having said rotors mounted thereon for rotation, said non-magnetic support plate including a projection projecting from an edge of said support plate in a direction of the length of said projection;
   first mounting means for mounting said first rotor for rotation on said projection of said non-magnetic support plate, and second mounting means for mounting said second rotor for rotation on said non-magnetic support plate at a position proximate said first rotor for magnetically coupling with said first rotor and offset from the length direction of said projection so that a direction between said first and second rotors and the length direction of said projection are non-parallel;
   a wheel train mounted on said support plate coupled with and driven by said second rotor; and
   a coreless field coil energizable to develop an electromagnetic field and including a coil bobbin having an axial bore dimensional to receive said projection and positioned with said projection inserted into said axial bore to mount said coreless field coil on said projection of said support plate with said first rotor within said axial bore and positioned to drive said first rotor with the electromagnetic field to thereby drive said wheel train upon energization of said coreless field coil.

2. An electromechanical driving device according to claim 1, wherein said coil bobbin has an end wall at one end of the bore and having an opening therethrough, and said projection has a resilient tab at an end thereof for deforming and extending through the opening through said end wall of said bobbin to engage the end wall and lock said bobbin mounted on said projection of said support plate.

3. An electromechanical driving device according to claim 1, wherein said projection of said support plate has a hole thereinto and said bobbin has a boss dimensional to fit within the hole and lock the bobbin to said projection of said support plate projection is flexible to clear said boss as inserted in the axial bore of said coil bobbin to mount the same on said projection.

4. An electromechanical driving device according to claim 1, wherein said first and second mounting means includes a pair of respective rotor shafts and corresponding holes through said support plate mounting said first and said second rotors for rotation, and wherein said wheel train includes a plurality of gear wheels each having a respective shaft mounted for rotation, said support plate having holes extending therethrough and dimensioned to receive an end portion of respective ones of said shafts and define bearing surfaces for the end portions of the respective shafts thereby mounting said shafts on said support plate for rotation, and wherein said bobbin has surface portions defining said axial bore and covering certain ones of the holes through said support plate to define a thrust bearing for the respective shafts mounted in the certain ones of the holes.

5. An electromechanical driving device according to claim 1, further comprising a second support plate, means mounting said second support plate on the first-mentioned support plate and spaced a distance therefrom to define a space therebetween, said first-mentioned and said second support plates each having a respective projection positioned opposite each other and dimensioned to fit within the axial bore of said bobbin and thereby mount the same on said support plates said rotor having a shaft, and each of said projections having a hole therethrough dimensioned to receive a respective end portion of said rotor shaft and define a bearing surface to mount said rotor shaft for rotation between said support plates, and said coil bobbin having a surface which covers the holes through said projections when said bobbin is mounted thereon to define thrust bearings for the end portions of said rotor shaft.

6. An electromechanical driving device according to claim 1, wherein the axial bore of said coil bobbin defines a guide for positioning said coil on said projection so that the direction of the magnetic field developed by said coreless coil has a predetermined orientation.

* * * * *